(12) United States Patent
Frazier et al.

(10) Patent No.: US 7,140,671 B2
(45) Date of Patent: Nov. 28, 2006

(54) MULTI-PIECE ROOF WITH REINFORCEMENT

(75) Inventors: William Frazier, Poneto, IN (US); Katrina R. Hunden, Fort Wayne, IN (US); Lawrence Hoffman, Hoagland, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 49 days.

(21) Appl. No.: 11/070,412

(22) Filed: Mar. 1, 2005

(65) Prior Publication Data

US 2006/0197360 A1    Sep. 7, 2006

(51) Int. Cl.
*B60J 7/00* (2006.01)

(52) U.S. Cl. .................... 296/190.08; 296/210

(58) Field of Classification Search ........... 296/190.08, 296/210, 190.02, 26.01, 26.08, 26.04
See application file for complete search history.

(56) References Cited

U.S. PATENT DOCUMENTS

| | | | | |
|---|---|---|---|---|
| 3,186,755 A | * | 6/1965 | Ward ........................ 296/178 |
| 3,551,014 A | * | 12/1970 | Tamruchi .................... 296/191 |
| 4,475,765 A | | 10/1984 | Vogt et al. | |
| 5,150,944 A | * | 9/1992 | Yoshida et al. ............... 296/29 |
| 5,488,770 A | * | 2/1996 | Yamada et al. ............ 29/897.2 |
| 5,735,568 A | * | 4/1998 | Arnold .................. 296/190.02 |
| 5,769,486 A | * | 6/1998 | Novoa et al. .......... 296/190.08 |
| 5,873,618 A | * | 2/1999 | Ejima .......................... 296/30 |
| 6,073,991 A | * | 6/2000 | Naert .................... 296/187.02 |
| 6,315,351 B1 | * | 11/2001 | Mondragon Sarmiento et al. ..................... 296/190.08 |
| 6,502,895 B1 | * | 1/2003 | Taylor ........................ 296/178 |
| 6,672,655 B1 | * | 1/2004 | Zinsmeister et al. ........ 296/210 |
| 6,733,069 B1 | | 5/2004 | Koch | |
| 6,883,860 B1 | * | 4/2005 | Budge .................. 296/190.08 |
| 7,021,702 B1 | * | 4/2006 | Vandendriessche et al. ..................... 296/190.08 |
| 2001/0003400 A1 | * | 6/2001 | Grimm et al. .............. 296/210 |
| 2003/0025357 A1 | * | 2/2003 | Fischer et al. ......... 296/190.08 |
| 2003/0042765 A1 | * | 3/2003 | Arthur et al. .......... 296/220.01 |
| 2006/0061145 A1 | * | 3/2006 | Strebe et al. .......... 296/193.04 |

\* cited by examiner

*Primary Examiner*—Kiran B. Patel
(74) *Attorney, Agent, or Firm*—Jeffrey P. Calfa; Dennis K. Sullivan; Susan L. Lukasik

(57) ABSTRACT

A roof for a sleeper compartment truck is built from a plurality of pieces of manageable size while minimizing the required labor and waste of material required for construction.

7 Claims, 11 Drawing Sheets

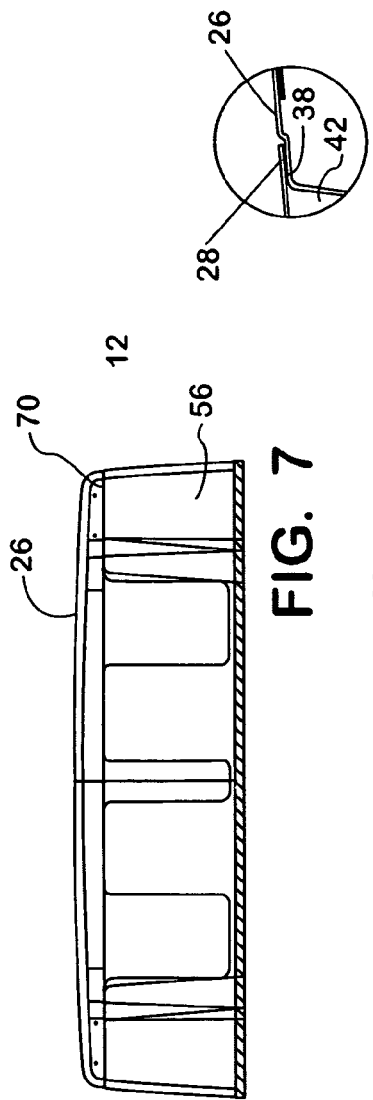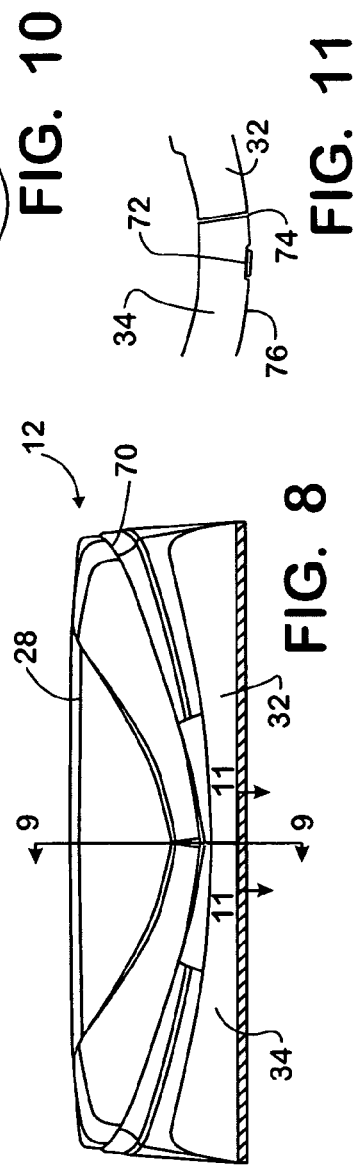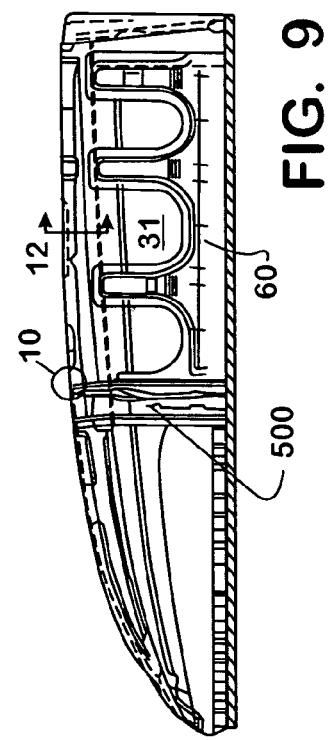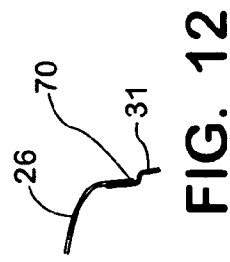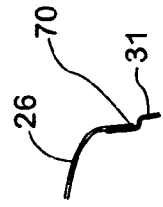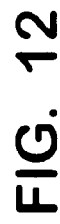

MULTI-PIECE ROOF WITH REINFORCEMENT

BACKGROUND OF THE INVENTION

1. Technical Field

The invention relates to motor vehicle assembly and more particularly to assembly of a roof for a sleeper compartment truck from a plurality of pieces of manageable size while minimizing the required labor and waste of material.

2. Description of the Problem

Typical roof designs for truck sleeper compartments call for a glass reinforced plastic shell made of one or a plurality of pieces. The shell has been separately reinforced, typically with reinforcements made of the same material as the shell. The reinforcements are required to meet strength and rollover protection requirements. Generally, increasing the number of components increases tooling costs, total cost for components and fabrication time. Construction of the shell from a single piece of glass reinforced plastic limits the number of suppliers and provides a difficult to handle component.

SUMMARY OF THE INVENTION

According to the invention there is provided a roof for a motor vehicle cab. The roof comprises front and aft sections. Each section of the sections having an exterior face and an interior face and at least a first, substantially straight, end edge, with first end edges being disposed in a side-by-side relationship. A C-section trough is formed along the front edge of the aft roof shell section. The C-section is depressed with respect to and open in the direction of the face for the aft roof shell section for application to the interior face of the front roof section which overlays it upon assembly. The C-section trough is disposed adjacent the interior face of the forward roof shell section inwardly from the front edge thereof to form with the second roof shell section a box section reinforcement beam running from side to side of the motor vehicle. Additional reinforcement beams are formed by direct application of trough like reinforcements against the interior surfaces of the major exterior pieces of the shell.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a rear plan view of the outer roof shell.

FIG. 8 is a front plan view of the outer roof shell.

FIG. 9 is a cross sectional view of the outer roof shell taken along section line 9—9 in FIG. 8.

FIG. 10 is a cross sectional view of a joint between the aft and forward outer roof shell sections.

FIG. 11 is a cross sectional view taken along section line 11—11 of FIG. 8.

FIG. 12 is a cross sectional view taken along section line 12—12 of FIG. 9.

DETAILED DESCRIPTION OF THE INVENTION

Figure 1:
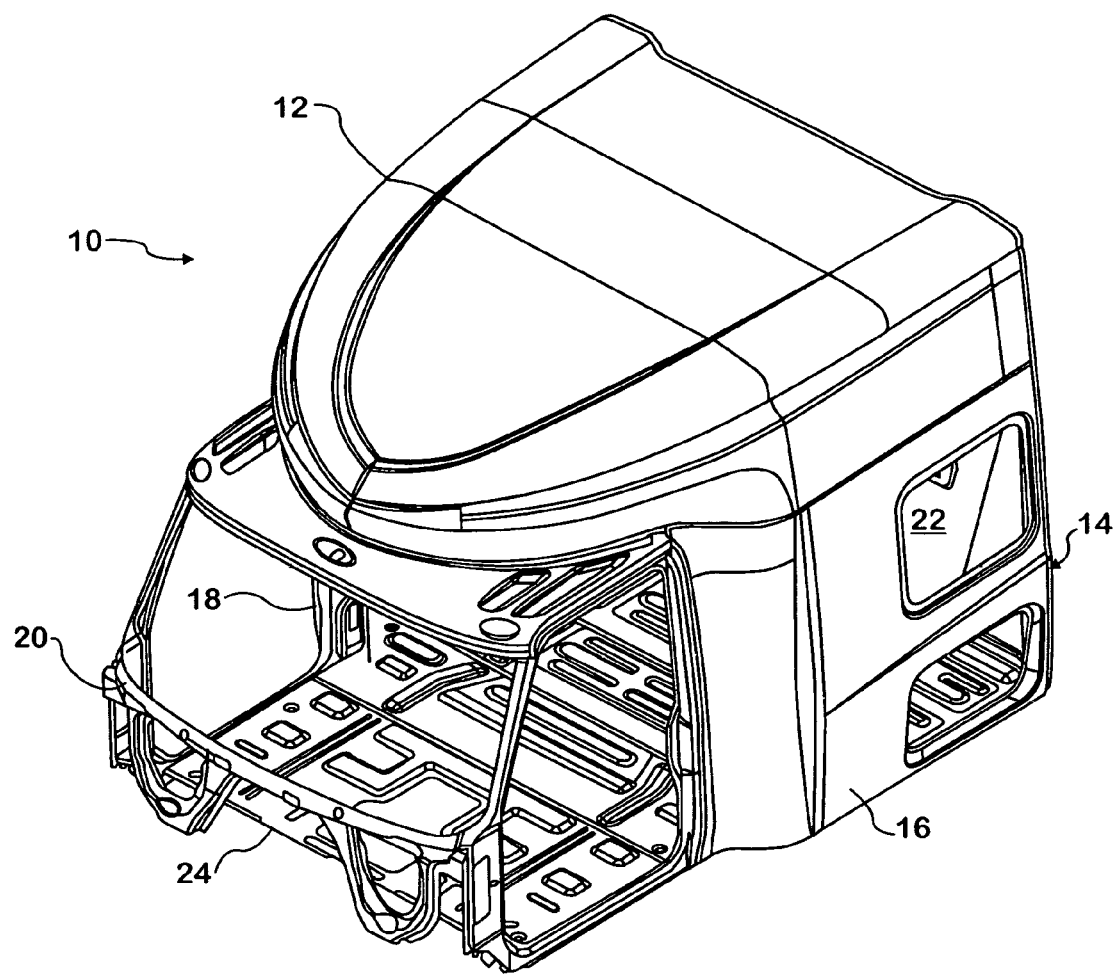
FIG. 1 is a perspective view of a sleeper cab shell for a truck.

Referring to FIG. 1 a sleeper cab shell 10 for a truck comprises an outer roof shell 12 and a main body shell and frame 14. As illustrated below, outer roof shell 12 rests on and is bonded to main body shell and frame 14. Main body shell and frame 14 comprise right and left sidewalls 18 and 16, a back wall 22, a forward frame 20 and a floor 24.

Figure 2:
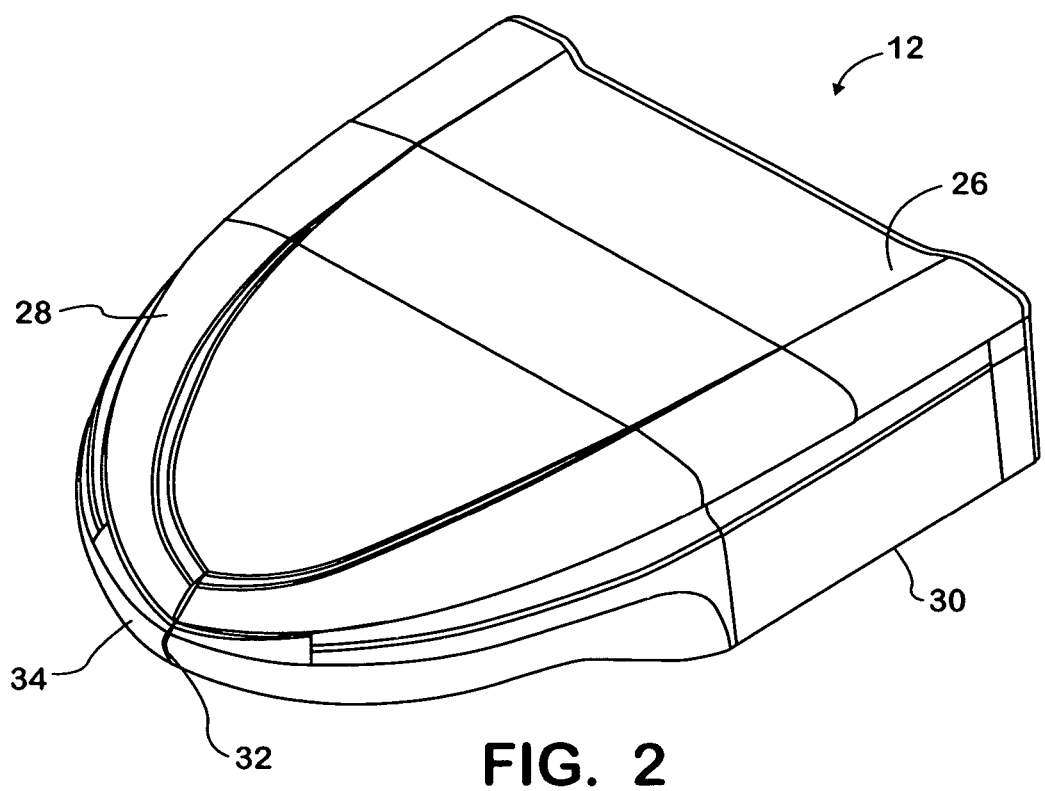
FIG. 2 is a perspective view of a outer roof shell for the sleeper cab shell of FIG. 1.

Outer roof shell 12 is a multi-piece body section, and is made from glass reinforced plastic sections which are joined by bonding using an adhesive. Such adhesives and bonding techniques are well known in the art and are not described in detail here. FIG. 2 illustrates the location of the several pieces which form the outer roof shell. These include an aft roof section 26, a forward roof section 28, a left side section 30, a left side leading section 32 and a right side leading section 34. A right side section and back wall are not visible in the figure. Forward roof section 28 tapers to a point at its forward most point to match the aerodynamic shaping of the paired left side and right side leading sections 32, 34.

Figure 3:
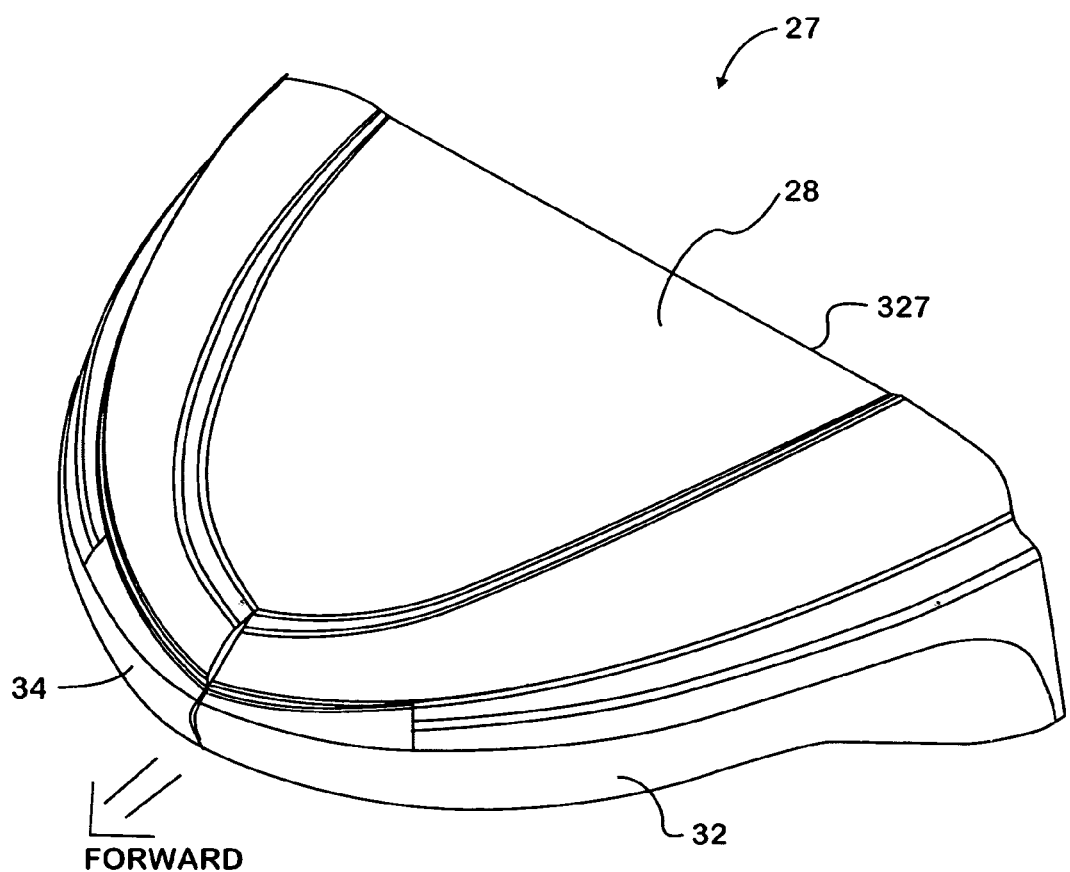
FIG. 3 is a perspective view of the forward section of the outer roof shell of FIG. 2.

In FIG. 3 it may be seen that the forward roof section 28 of outer roof shell 12 is a semi-circular piece resting on two bowed forward leading sections 32, 34, which together form a partial assembly of the outer roof shell 12. The bowing of the mated leading sections 32, 34 tracks the curvature of the leading edge of forward roof section 28 to produce an aerodynamic shape.

Figure 4:
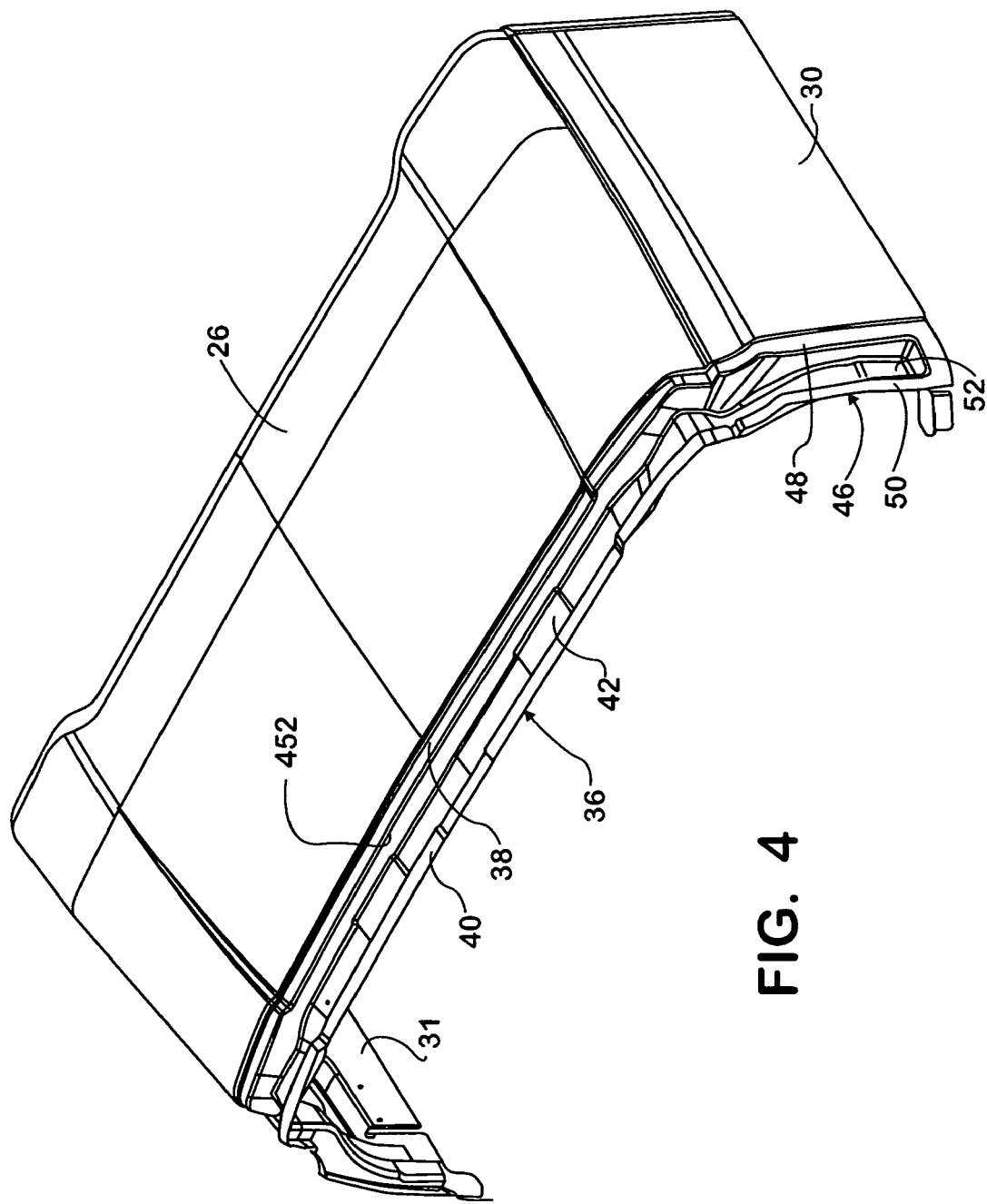
FIG. 4 is a perspective view of the aft section of the outer roof shell of FIG. 2.

FIG. 4 illustrates aspects of the configuration of an aft roof assembly 25 including aft roof section 26, left side section 30 and right side section 31. Aft roof section 26 as assembled provides a reinforcement channel 36 formed along a forward edge 452 of the aft roof section 26 and left and right side sections 31. Reinforcement channel 36 is a C-channel positioned to support from below the forward roof section 28 from inside of its trailing edge 327. Reinforcement channel 36 runs from side to side, perpendicular to the direction of travel of the vehicle. Reinforcement channel 36 includes troughs 42 (formed in aft roof section 26) and 52 (formed in left side section 30). Running the lengths of troughs 42 and 52 are strips 38, 40, 48 and 50 (as well as similar strips for right side section 31). Strips 38, 40, 48 and 50 are intended to be brought into contact with the under, interior surfaces 128 (See FIG. 13) of forward roof section 28 and left side leading section 32. Conventional adhesives used with glass reinforced plastics are used between strips 38, 40, 48 and 50 and the forward roof section 28 and left side leading section 32 which bond the elements into what is essentially a joint piece. Combined with the forward elements, reinforcement channel 36 becomes a box frame element 500 (See FIGS. 9, 13) reinforcing the joint roof structure which runs from side to side of the vehicle just behind the vehicle's doors.

Figure 5:
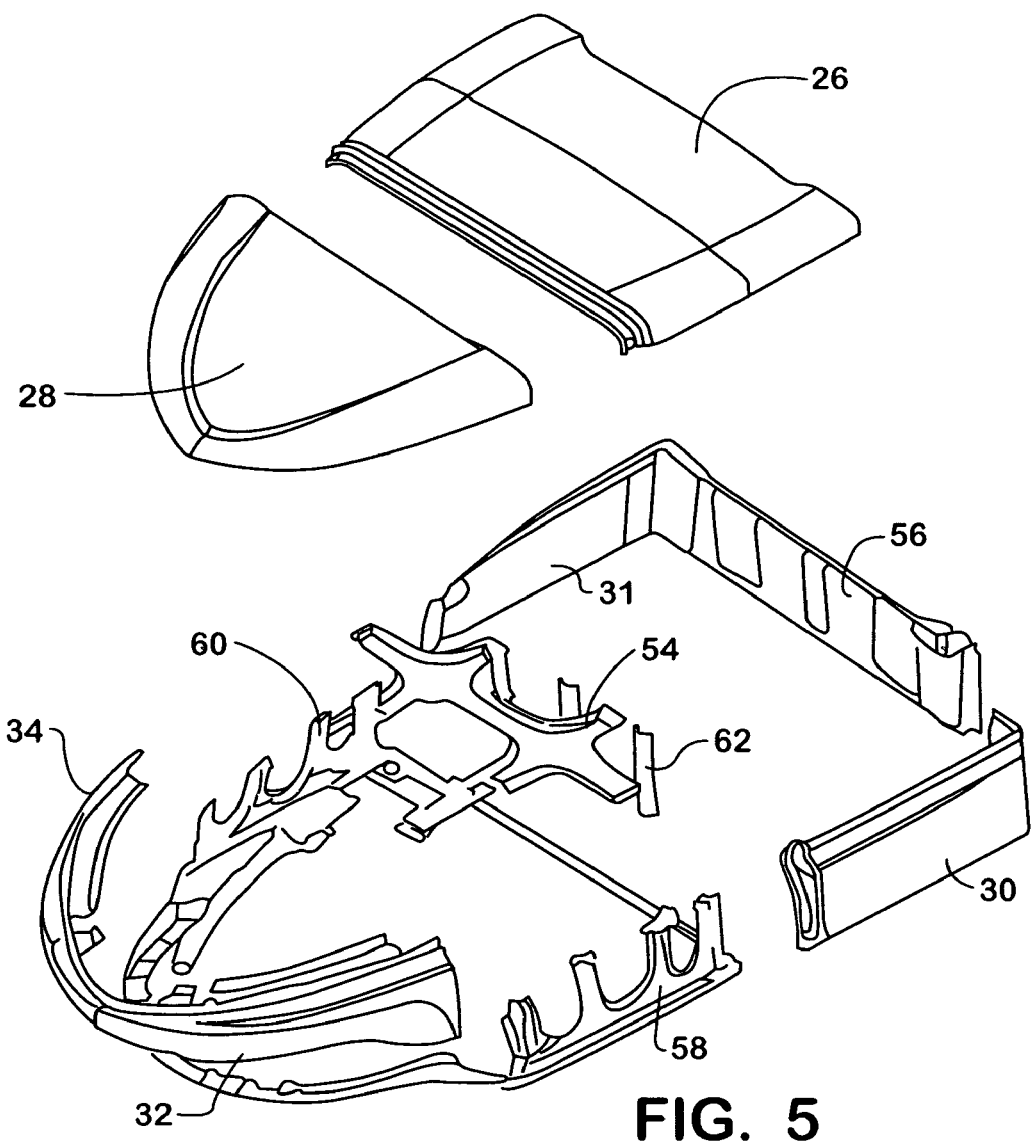
FIG. 5 is an exploded view of the outer roof shell.

FIG. 5 is an exploded view of the outer roof shell 12. Outer roof shell 12 comprises forward and aft roof sections 28, 26. Shell 12 further comprises left and right leading side sections 32 and 34 as well as trailing left and right side sections 30, 31. A back wall 56 fits between the trailing edges of left and right side sections 30, 31. Supplemental reinforcement sections underlie the roof sections and side sections, including an aft supplemental roof reinforcement section 54, back wall reinforcement sections 62 and left and right side supplemental reinforcement sections 58 and 60. Supplemental reinforcement sections are essentially pieces with trough like cross sectional portions. Applied by adhesive to inside surfaces of exterior shell elements, they combine with those elements to form box-type beam supports.

Figure 6:
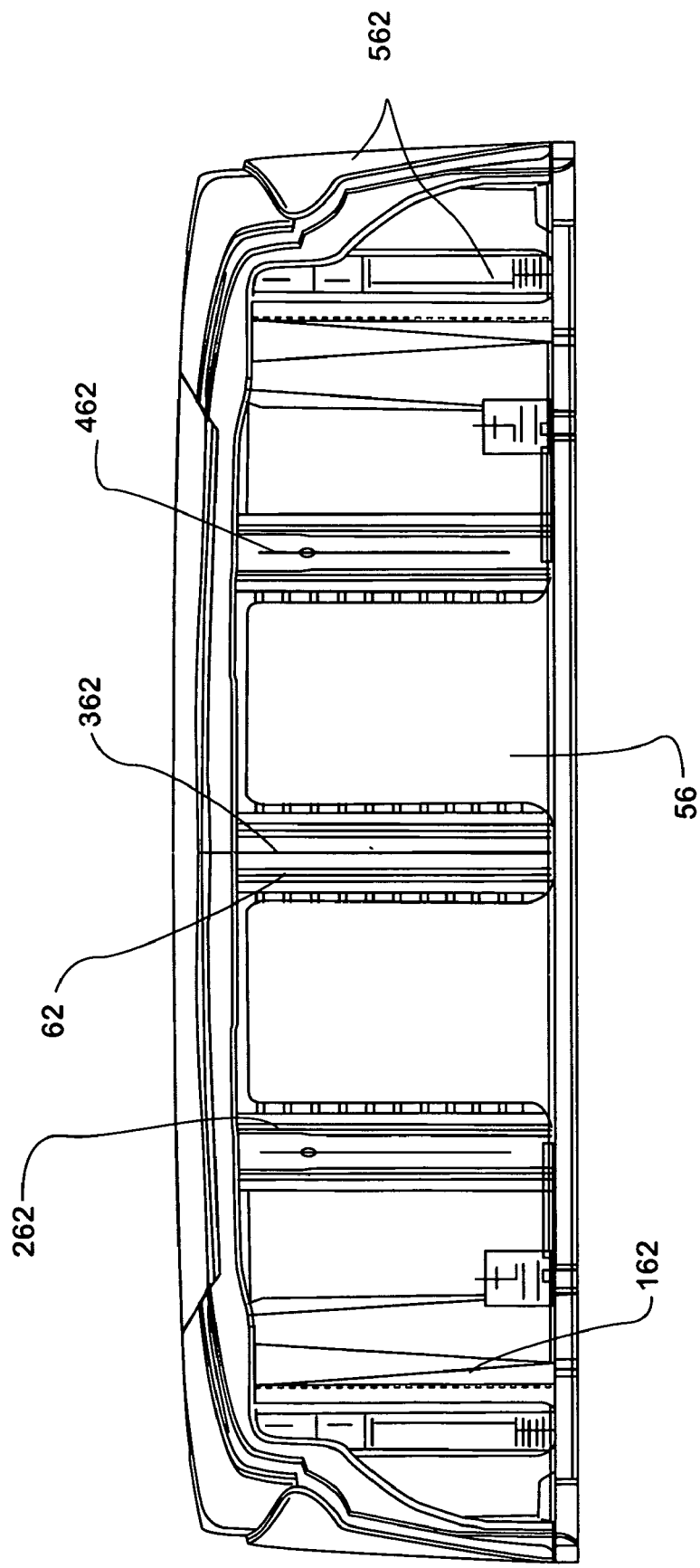
FIG. 6 is a plan view from inside of the outer roof shell toward the back wall to the outer roof shell.

FIG. 6 is a plan view from inside of the outer roof shell 12 illustrating positioning of back wall reinforcements 62 against the back wall element 56. Back wall reinforcement sections 62 include five vertical channel sections 162, 262, 362, 462 and 562. All of the channel sections are C-channels with bordering strips allowing application and bonding to the inner wall of the back wall 56 to form a box type beam support.

FIGS. 7 and 8 illustrate outer roof shell 12 front and back, highlighting the front end streamlining of the shell and indicating the location of a seem 70 between the forward and aft roof sections 28, 26, on the one hand, and the back wall 56 and right and left side leading sections 34, 32. FIG. 9 shows the location of a side reinforcement section 60 adhering to the inside face of right side section 31.

FIGS. 10–12 are cross sections illustrating joints between several sections of outer roof shell 12. In FIG. 10 the overlap of forward roof shell section 28 where it contacts and rests on strip 38 between trough 42 and the main body of aft roof shell section 26 is illustrated. In FIG. 11 the juncture of leading side sections 32 and 34 is closed by overlays 74 and 76. An indentation 72 in the outside face of section 34 is partially covered by overlay 76 forming a pocket into which a hooked end of overlay 74 fits. The effect is to produce a leak proof fitting. FIG. 12 illustrates that aft roof section 26 rests on the upper edge of side section 31.

Figure 13:
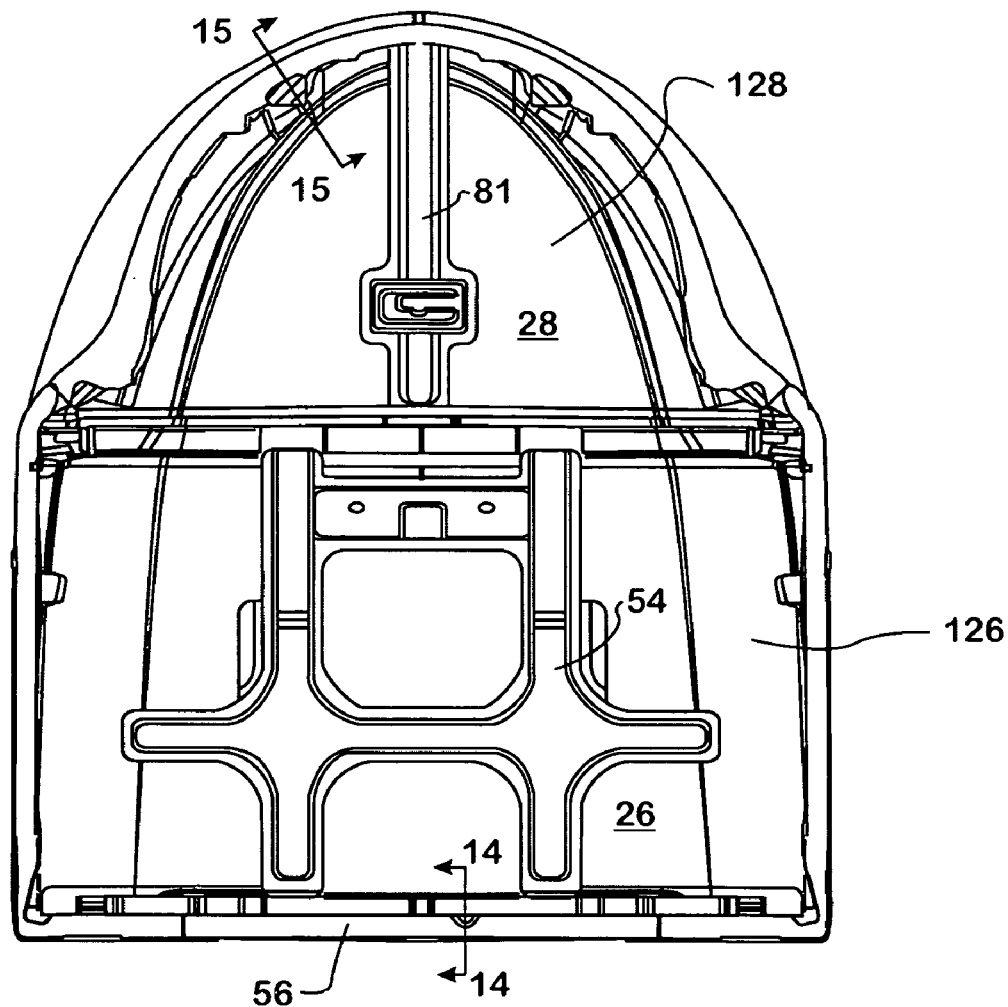
FIG. 13 is a bottom plan view of the inside of the roof shell.
Figure 14:
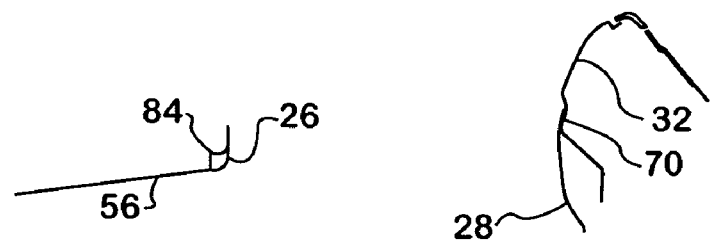
FIG. 14 is a cross sectional view taken along section line 14 of FIG. 13.
Figure 15:
FIG. 15 is a cross sectional view taken along section line 15—15 of FIG. 13.

FIG. 13 illustrates fitting of reinforcement sections 54 and 81 to the lower interior surfaces 126, 128 of aft roof section 26 and forward roof section 28, respectively. Reinforcement sections 54 and 81 are open channel sections, applied with the channel side open to the surface of the section to be reinforced so that upon bonding, a box section beam is formed from these walls of the reinforcement element and a fourth wall from the reinforced shell element. FIG. 14 illustrates reinforcement of the base of rear wall 56 where it turns inwardly to form a flange for support on cab 14. Reinforcement is affected by an open, flattened W-shaped member applied by its bottom face against the main portion of the interior surface of back 56 and the turned in flange. The exterior arms of the "W" are joined to the sub-sections back 56 and the interior arms form with those sub-sections a box section reinforcement member. FIG. 15 illustrates the overlap of forward roof section 28 over leading left side section 32 along joint 70.

Figure 16:
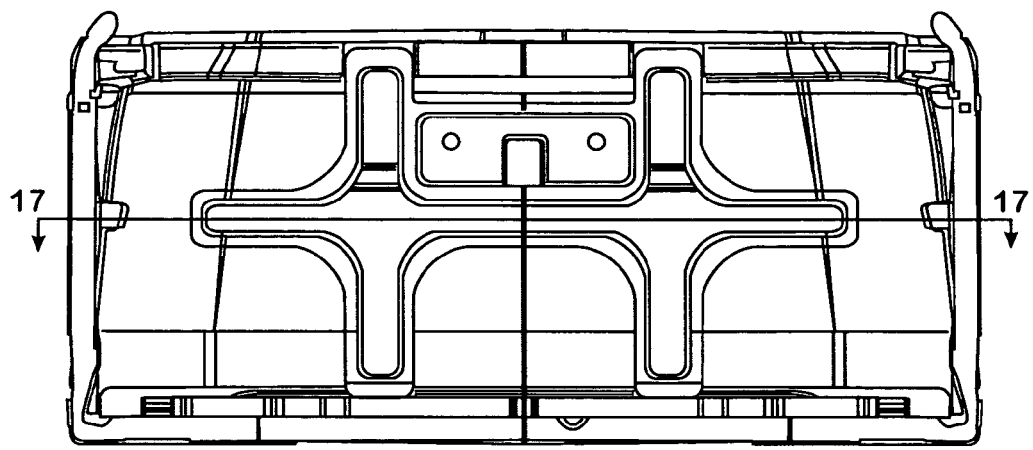
FIG. 16 is a bottom plan view of the aft section of a other roof shell.
Figure 17:
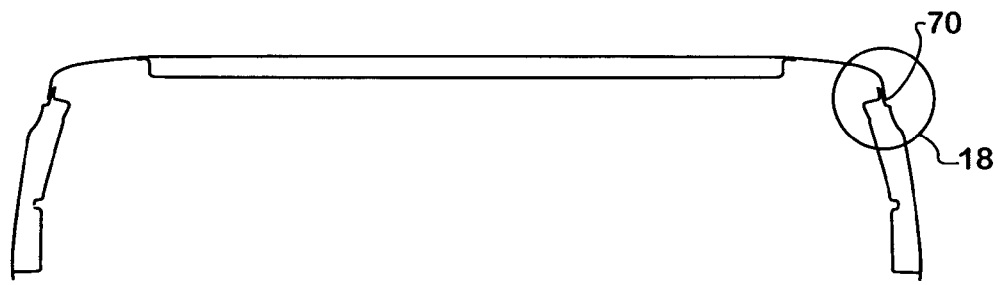
FIG. 17 is a cross sectional view taken along section line 17—17 of FIG. 16.
Figure 18:
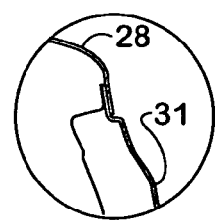
FIG. 18 is a cross sectional view taken from the area marked 18 in FIG. 17.
Figure 19:
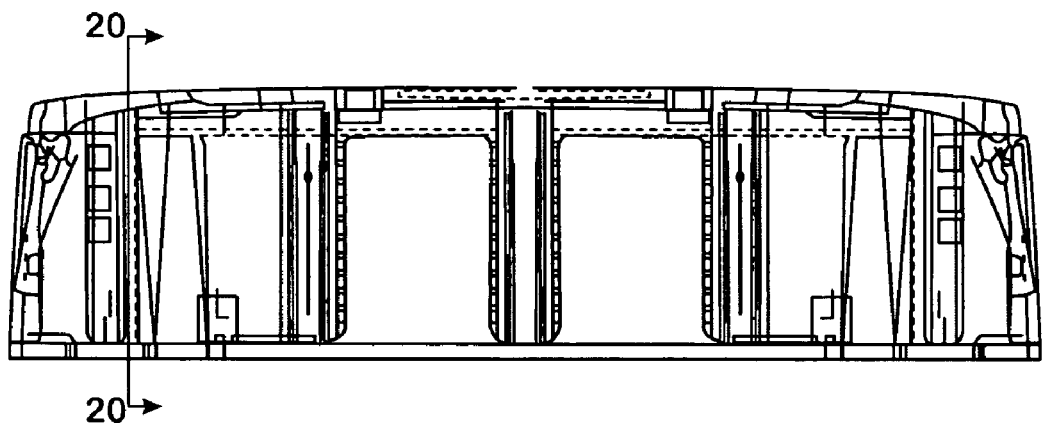
FIG. 19 is an elevation of the aft wall from the inside of the outer roof shell.

FIG. 16 is a bottom plan view of the aft section of outer roof shell 12 illustrating a reinforcement piece 57 which is adjusted in size to fit a shortened aft roof section. FIGS. 17 and 18 illustrate formation of joint 70 from an overlap of aft roof section 26 over right side section 31.

Figure 20:
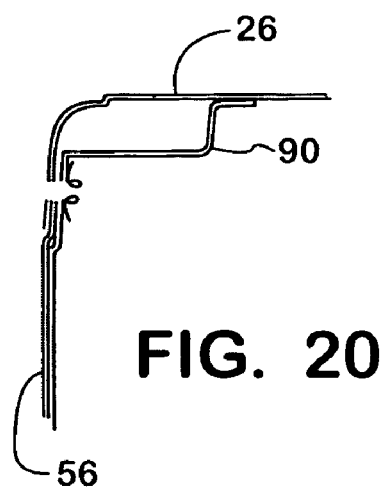
FIG. 20 is a cross sectional view taken along section lines 20—20 of FIG. 19.
Figure 21:
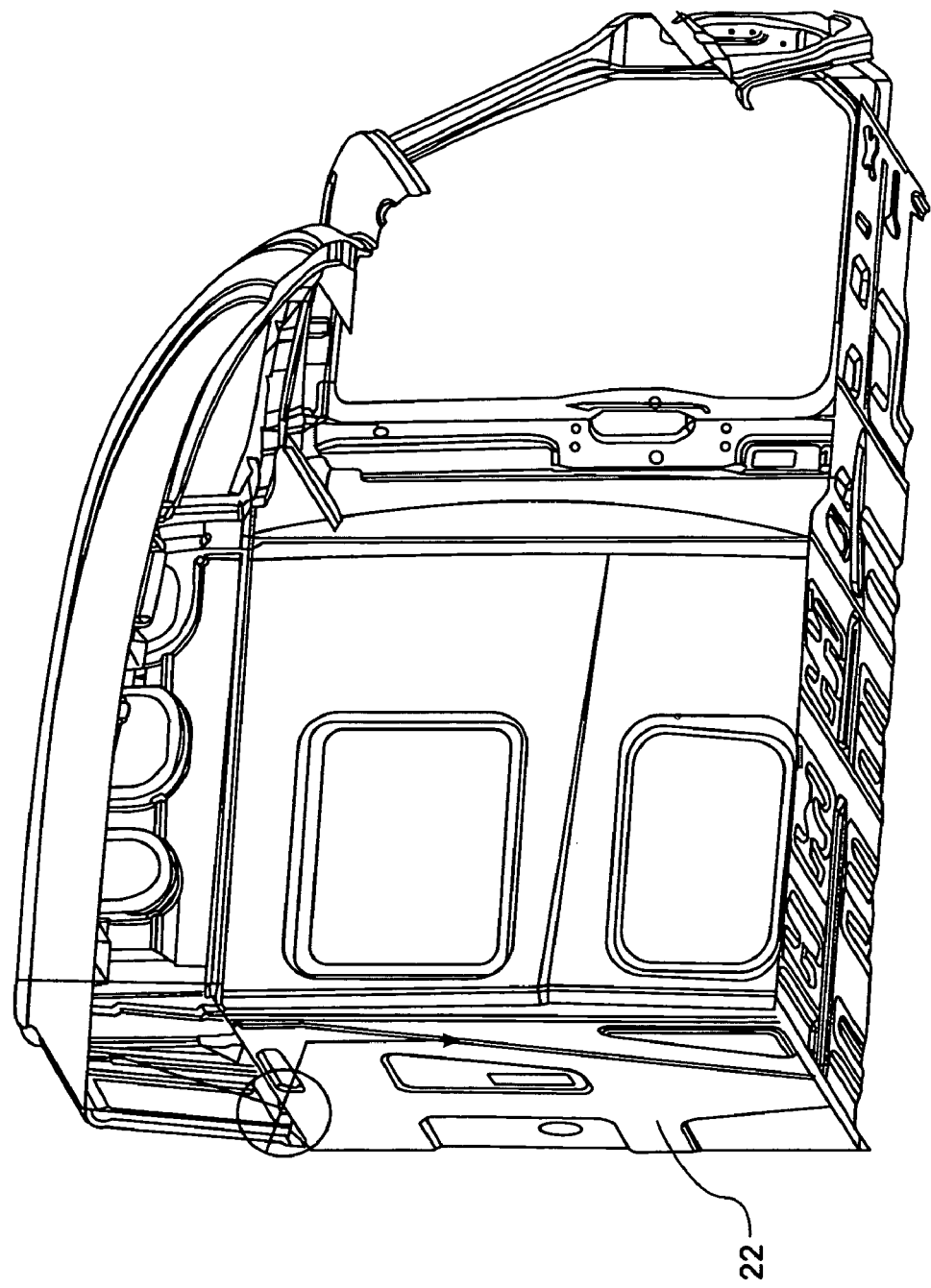
FIG. 21 is a perspective view in partial section illustrating mating of a roof shell to the framework of a cab shell.

FIGS. 20 and 21 illustrate joint 70 of aft roof section and back wall 56 and reinforcement of the area using a flattened S-shaped member 90 which is fitted to brace the sections against one another.

The invention provides a roof shell for a sleeper cab which is simple to construct from elements which are in turn easily fabricated.

While the invention is shown in only one of its forms, it is not thus limited but is susceptible to various changes and modifications without departing from the spirit and scope of the invention.

What is claimed is:

1. A motor vehicle cab comprising:
   a cab shell;
   first and second roof shell sections, each of the first and second roof shell sections having an interior surface and a substantially straight end edge, with the end edges being disposed side by side;
   a C-section trough formed along the end edge of the first roof shell section, the C-section being depressed with respect to and open in the direction of the interior surface of the second roof shell section; and
   the C-section trough being disposed adjacent the interior surface of the second roof shell section inwardly from the end edge of the second roof shell section and forming with the second roof shell section a box frame element running from side to side of the cab shell.

2. The motor vehicle cab of claim 1, further comprising:
   the first roof shell section being aft of the second roof shell section.

3. The motor vehicle cab of claim 2, further comprising:
   left side, right side and rear edges to the first roof shell section;
   left side and right side sections supporting the first roof shell section from under the left and right side edges of the first roof shell section, respectively;
   a rear wall supporting the first roof shell section along its rear edge of the first roof shell section;
   left and right side edges to the second roof shell section meeting at a forward end of the second roof section; and
   left side and right side leading sections supporting the second roof section along the left and right sides thereof, respectively.

4. The motor vehicle cab of claim 3, further comprising:
   an aft roof supplemental reinforcement section for the first roof shell section applied to the interior surface of the first roof shell section, the aft roof supplemental reinforcement section including at least a first channel element for forming with the first roof shell section a box section beam.

5. The motor vehicle cab of claim 3, further comprising:
   a forward roof supplemental reinforcement section for the second roof shell section applied to the interior surface of the second roof shell section, the aft roof supplemental reinforcement section including at least a first channel element for forming with the second roof shell section a box section beam.

6. The motor vehicle cab of claim 3, further comprising: left and right side supplemental reinforcement sections for the left and right side sections, respectively, the left and right supplemental reinforcement sections being applied to the interior surfaces of the left and right side sections, respectively, the left and right side supplemental reinforcement sections, each including at least a first channel element for forming with the respective side section a box section beam.

7. The motor vehicle cab of claim 3, further comprising: a rear wall supplemental reinforcement section for the rear wall, applied to the interior surface of the rear wall and including at least a first channel element for forming with the rear wall a box section beam.

* * * * *